Figure 3:
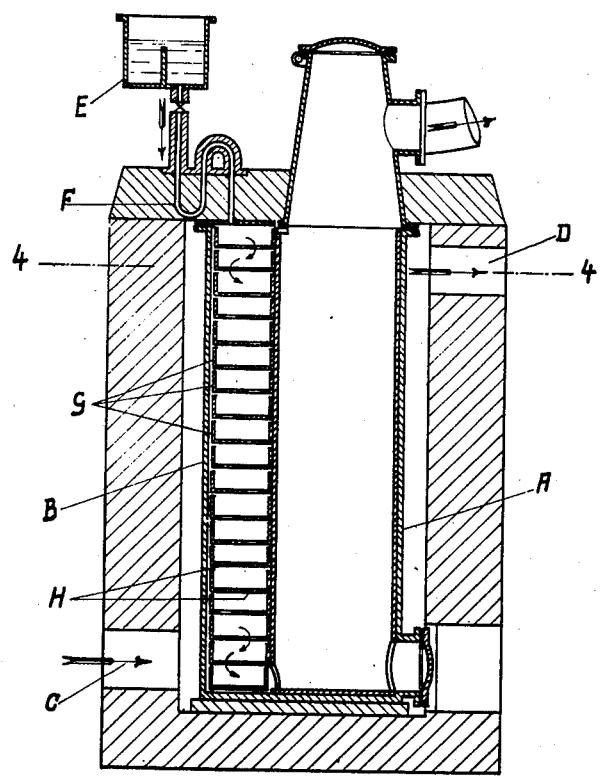

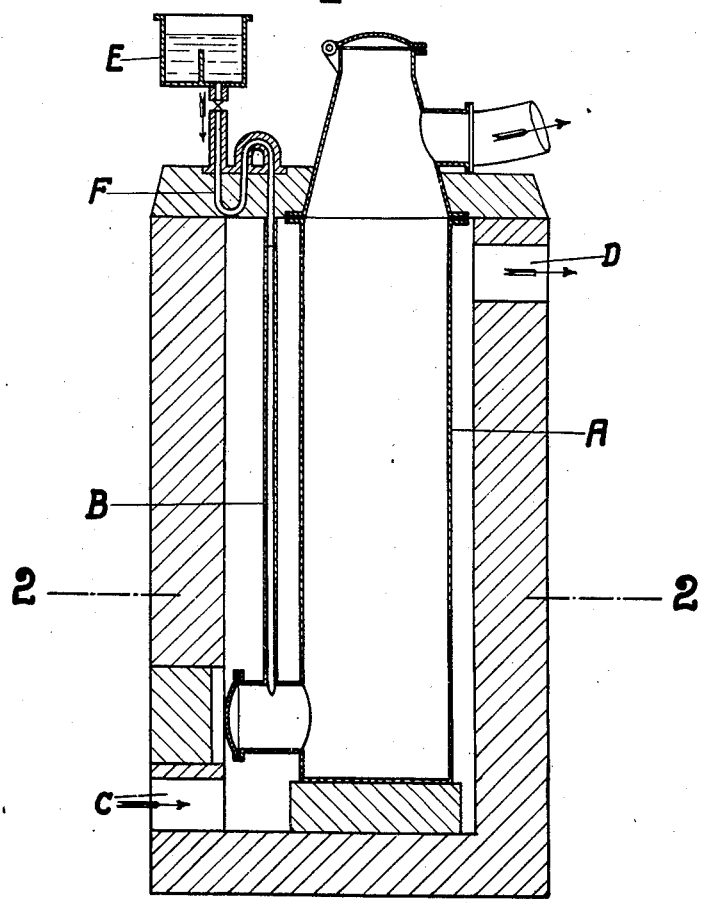
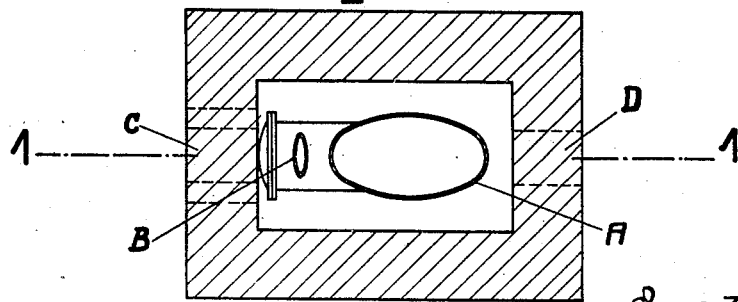

Patented Feb. 17, 1931

1,793,181

UNITED STATES PATENT OFFICE

EBERHARD LEGELER AND HERMANN KOB, OF PREMNITZ, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

APPARATUS FOR PRODUCING CARBON DISULPHIDE

Application filed January 13, 1928, Serial No. 246,586, and in Germany December 13, 1926.

Applications have been filed in Germany, the 13th of December, 1926 and 31st of May, 1927 with affiants' knowledge and consent in the name of I. G. Farbenindustrie Aktiengesellschaft; and filed in Belgium November 22, 1927; Great Britain, December 3, 1927; France, November 24, 1927; Switzerland, November 22, 1927; Austria, November 11, 1927; Czechoslovakia, November 18, 1927.
The present invention relates to apparatus for producing carbon-disulphide and is founded upon the fact that it is advantageous to superheat the sulphur vapors before introducing them into the reaction retort.
The yield of the process is already increased when superheating the sulphur vapors to a temperature of about 550° C., i. e., to only 100° C. more than the boiling point of sulphur. The best yield is obtained when superheating the sulphur vapors to the temperature of the reaction retort i. e. to about 800–1000° C. However, at this temperature the sulphur vapors affect all materials especially ceramic materials so strongly that it is more economical to superheat the sulphur vapors only to a temperature of about 700 to 800° C. When the process is carried out in this way it yields about four to five times as much bisulphide of carbon as when using non-superheated sulphur vapors.

The object of our invention is an apparatus to perform the production of carbon disulphide on the principle above described. According to the annexed diagrammatic drawings, in which by Figs. 1 to 4 are shown two modifications of our apparatus in a vertical and horizontal cross section, we arrange in a heating chamber a main retort A, containing charcoal heated up to 800 to 1000° C. Herein the reaction between carbon and sulphur takes place rapidly when superheated vapors of sulphur are introduced. The latter are produced in a supplementary retort B forming an upright channel along the main retort, when liquid sulphur contained in a vessel E, disposed on the top of said supplementary retort, is caused to flow through the swannecked tube F and to vaporize while running down in the supplementary retort B.
The main retort and the supplementary re-
tort being heated by the same fire-gases, entering the heating chamber at C and leaving at D, about the same temperature is acting on the two retorts. We prefer to maintain the main retort at a temperature of about 800 to 1000° C.; however the supplementary retort at its lower (hottest) end will reach only a somewhat lower temperature, say 600 to 800° C., the superheating of the sulphur vapors being accompanied by the dissociation of the sulphur vapor absorbing a large amount of heat. Therefore the temperature of the superheated sulphur vapors is prevented to rise as high as that of the contents of the main retort, the more so as the rate of sulphur entering the superheated channel is increased.

It is essential to give the superheating channel or retort B a large surface relative to the area of its cross section; for instance by a rectangular or elliptic cross section, so that the large amount of heat required can easily be transferred to the sulphur vapors; obviously, as regards the ratio of the cross sections of the main retort to the supplementary retorts we desire not to be limited to the example represented in the drawings.

Figure 4:
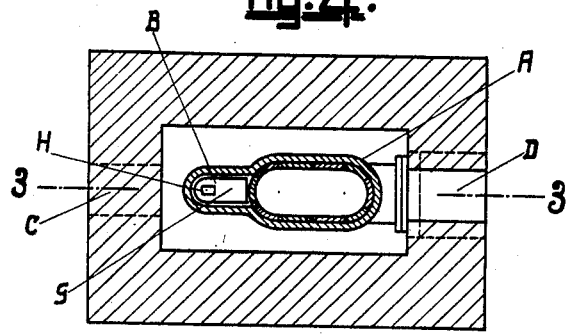

For the embodiment of our invention we have found it especially advantageous to combine the main retort A with the superheating retort B as shown in Figs. 3 and 4 and as more fully explained in the following description.

A is the main retort of cast steel and lined with masonry, to be filled wih charcoal or other suitable carbonaceous matter. B is the extension for generating and superheating the sulphur vapors, cast integral with A. The heating gases enter the furnace near the bottom at C, and leave it near the top at D. E is a container from which molten sulphur flows through pipe F into the superheating retort B. The latter is equipped with a plurality of uniform bowls or pans G having flat bottoms with openings H therein near one of the ends of the ellipse. The openings are offset with respect to each other so that the vapors have to take a tortuous way through the superheating retort. The liquid sulphur entering the supplementary retort through pipe F is speedily volatilized while running down and as the heating chamber is heated to a temperature of about 800 to 1000° C. the vapors on their tortuous passage are superheated and dissociated to a considerable extent before entering at the bottom end of the extension B into the reaction retort. As the fire gases enter the furnace near the bottom where the sulphur vapors enter the main retort the lower end of the supplementary retort is exposed to the highest temperature and thereby the superheating of the sulphur vapors is effected in the most rational manner. In case of a plurality of extensions the fire gases may be introduced into the furnace by a corresponding number of fire holes.

As to the relative proportions of the main retort and the extension experience has shown that in respect to the amount of heat to be transmitted the surface of the extension (or extensions) should be chosen not smaller than about one third of the surface of the main retort.

It is a special advantage in arranging and dimensioning the extensions so that the insertion of the ceramic equipment into each supplementary retort can be effected by a mason standing in the main retort. The lin- of the main retort should cover the equipments in the extension from the top nearly to the lower end of the retort.

The ceramic equipments of the superheaters B may also consist of a loose granular material, for instance, of broken chamotte, of so-called Raschig rings of porcelain, or of highly aluminous material, such as bauxite. However, a more regular guidance of the vapors is warranted by conducting the vapors through the bowls described or over baffles of baffle-plates which may be placed upon ribs cast on the inner walls of the supplementary retort or secured in any other suitable manner.

We claim:—

1. Apparatus for producing carbon disulphide comprising a heating chamber, an elongated main retort therein to contain a charge of carbon, at least one elongated supplementary retort of substantially the same length as said main retort and lying throughout a substantial portion of its length in contact with said main retort in said heating chamber, a device for introducing liquid sulfur at one end of the said supplementary retort and means at the opposite end thereof for conducting superheated sulfur vapors produced in said supplementary retort into said main retort.

2. Apparatus for producing carbon disulphide comprising a heating chamber, an elongated main retort to contain a charge of carbon and vertically disposed therein, at least one elongated vertically disposed supplementary retort of substantially the same height as said main retort in said heating chamber forming an extension of the main retort and cast integral therewith, a device for introducing sulphur at one end of said supplementary retort and means at the opposite end thereof for conducting super-heated sulphur vapors produced in said supplementary retort into said main retort.

3. Apparatus in accordance with claim 1, the supplementary retort containing superimposed bowls of refractory ceramic material provided with openings, the openings being offset with respect to each other to effect a tortuous passage of the vapors.

4. Apparatus in accordance with claim 1, the surface of the supplementary retort amounting to at least one third of the surface of the main retort.

5. Apparatus in accordance with claim 1, in which there is provided at the lower end of the heating chamber means for introducing heating fluid.

In testimony whereof, we affix our signatures.

EBERHARD LEGELER.
HERMANN KOB.